United States Patent

Bertolini et al.

[11] Patent Number: 5,521,447
[45] Date of Patent: May 28, 1996

[54] OSCILLATION DAMPING ELASTIC SUPPORT FOR AN ELECTRIC MOTOR HOUSING

[75] Inventors: Thomas Bertolini, Rheinau; Josef Wehberg; Gerd Knöpfel, both of Bühl, all of Germany

[73] Assignee: Robert Bosch GmbH, Stuttgart-Feuerbach, Germany

[21] Appl. No.: 310,792

[22] Filed: Sep. 29, 1994

[30] Foreign Application Priority Data

Oct. 7, 1993 [DE] Germany ............... 43 34 202.7

[51] Int. Cl.$^6$ ................................. H02K 5/24
[52] U.S. Cl. ........................ 310/51; 310/91
[58] Field of Search ..................... 310/51, 89, 91

[56] References Cited

U.S. PATENT DOCUMENTS

| | | |
|---|---|---|
| 1,638,968 | 8/1927 | Soderberg . |
| 2,056,676 | 10/1936 | Kennedy ................... 310/51 |
| 2,905,411 | 9/1959 | Cunningham ............ 310/51 |
| 3,323,763 | 6/1967 | Butts ......................... 310/51 |
| 3,343,016 | 9/1967 | Lewis ........................ 310/51 |
| 4,082,974 | 4/1978 | Yamamoto et al. ....... 310/51 |
| 5,019,737 | 5/1991 | Bruno ....................... 310/89 |

FOREIGN PATENT DOCUMENTS

| | | | |
|---|---|---|---|
| 398985 | 11/1933 | Belgium ............... | F16F 15/073 |
| 0550706 | 7/1993 | European Pat. Off. ....... | B60S 1/49 |
| 2843749 | 4/1979 | Germany ............... | 310/51 |
| 8811934 | 12/1988 | Germany ............... | H02K 5/24 |
| 0091643 | 7/1981 | Japan .................... | 310/51 |

OTHER PUBLICATIONS

"Comment Soigner les Machines Tournantes . . . qui Vibrent", Mésures Regulation Automatisme, vol. 44, No. 11, Nov. 1979, pp. 97–108.

*Primary Examiner*—Thomas M. Dougherty
*Attorney, Agent, or Firm*—Spencer & Frank

[57] ABSTRACT

An electric motor includes a generally tubular housing portion having an outer surface; a plurality of fixedly held support bases spaced circumferentially about the housing portion and being at a radial distance from the outer surface of the housing portion; and a plurality of elastic elements, each being secured to the outer surface of the housing portion and to a separate one of the support bases for supporting the electric motor by the housing portion and for suppressing excitation oscillations generated by the electric motor during operation thereof. The elastic elements together form a suspension system which is tuned to the excitation oscillations of the electric motor such that the natural frequency of the suspension system is less than the excitation frequency of the electric motor.

10 Claims, 1 Drawing Sheet

OSCILLATION DAMPING ELASTIC SUPPORT FOR AN ELECTRIC MOTOR HOUSING

CROSS REFERENCE TO RELATED APPLICATION

This application claims the priority of German Application No. P 43 34 202.7 filed Oct. 7, 1993, which is incorporated herein by reference.

BACKGROUND OF THE INVENTION

This invention relates to an electric motor which has an at least approximately tubular housing portion. The outer surface of the tubular housing portion is at a radial distance from a plurality of fixedly held, circumferentially adjacent support bases. Between each support base, on the one hand, and the outer surface of the housing portion, on the other hand, a separate elastic element is disposed which is in engagement with the outer surface of the housing portion and the respective support base for holding the electric motor and for suppressing excitational vibrations of the electric motor during its operation.

An electric motor is known in which the elastic elements are formed by intermediate elastomer layers which hold the electric motor at the stationary support bases and which, at the same time, serve for damping oscillations (vibrations) of the electric motor generated by excitation. These two counteracting requirements necessarily lead to a compromise because for a reliable support of the electric motor the intermediate layers have to be pre-stressed to a certain extent. Since the damping of the oscillations is effected by a flexing of the intermediate layers, an optimal separation of the support bases from the oscillations of the motor holders is not possible. Since such assemblies have to be frequently installed in air conditioning systems for automotive vehicles where the support bases are situated at the walls of air ducts which act as resonating members, such oscillations lead to undesirable operational noises.

SUMMARY OF THE INVENTION

It is an object of the invention to provide an electric motor having an improved electric motor support assembly of the above-outlined type which achieves a superior isolation of oscillations by a closely-tuned coupling of the electric motor to the support bases.

This object and others to become apparent as the specification progresses, are accomplished by the invention, according to which, briefly stated, the electric motor includes a generally tubular housing portion having an outer surface; a plurality of fixedly held support bases spaced circumferentially about the housing portion and being at a radial distance from the outer surface of the housing portion; and a plurality of elastic elements, each being secured to the outer surface of the housing portion and to a separate one of the support bases for supporting the electric motor by the housing portion and for suppressing excitation oscillations generated by the electric motor during operation thereof. The elastic elements together form a suspension system which is tuned to the excitation oscillations of the electric motor such that the natural frequency of the suspension system is less than the excitation frequency of the electric motor.

In the arrangement according to the invention an isolation of the oscillations means that at constant amplitudes of the excitation forces the dynamic forces transmitted by the resilient support constitute but a fraction of the excitation forces. This is achieved by the proper selection of tuning conditions $\eta$ of the spring system where $$\eta = \frac{\omega}{\omega_1} = \frac{\text{excitation frequency}}{\text{natural frequency}}$$

applies. A high degree of isolation of oscillation is achieved when $\eta > 1$, that is, $\omega > \omega_1$. This is termed as a supercritical excitation or a closely coordinated (tuned) system.

According to a further advantageous feature of the invention, the elastic elements are cross-sectionally essentially U-shaped, preferably metal strips whose length is oriented parallel to the rotary axis of the motor armature. The outer face of the base of the "U" engages the outer face of the tubular housing portion and the legs of the "U" are held at their free ends in the fixed support bases. This arrangement is particularly advantageous because, due to the great rigidity of the strips in the axial direction, in case of motors of short structural length and large diameter, an undesired tilting or pitching of the motor axis from its original position is prevented.

DESCRIPTION OF THE PREFERRED EMBODIMENTS

Figure 2:
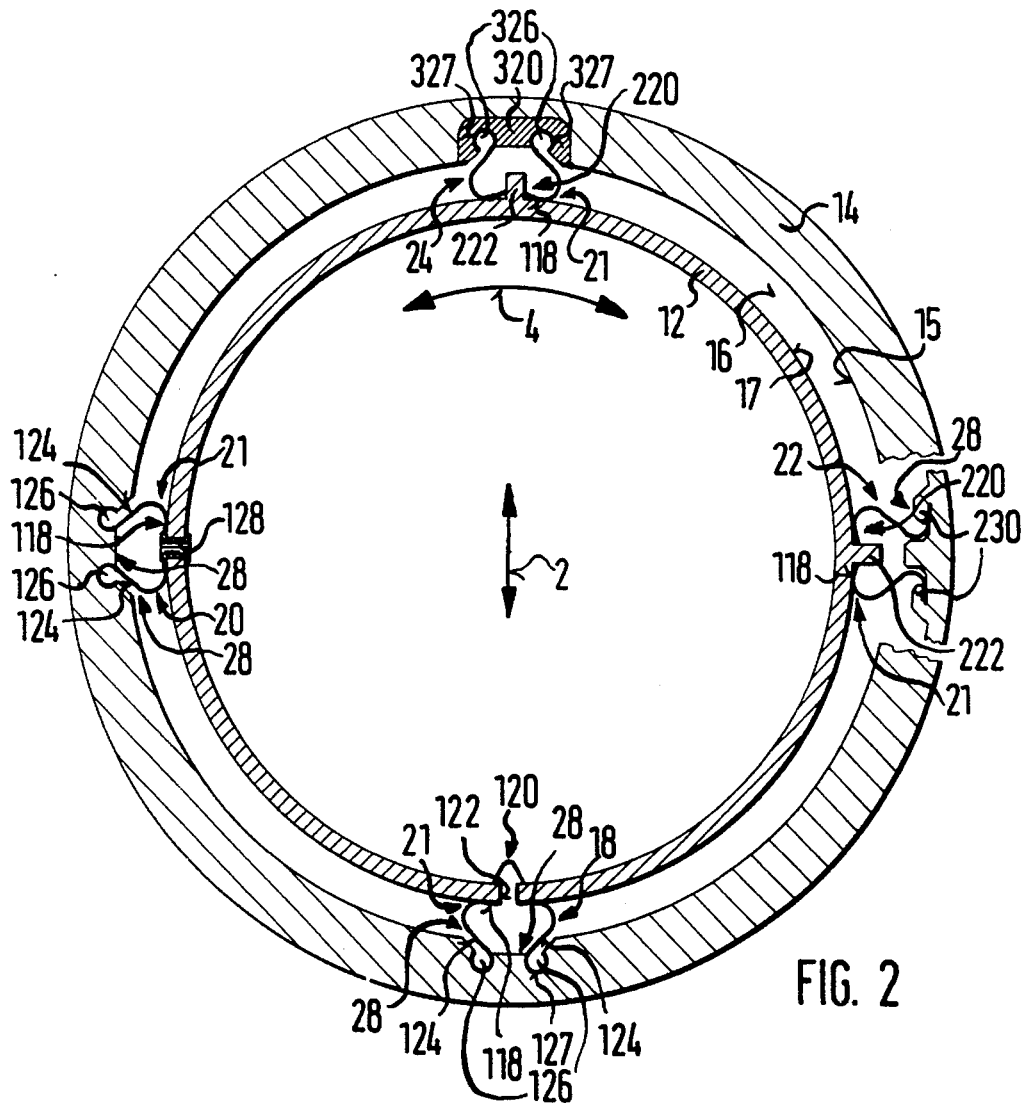
FIG. 2 is a sectional view taken along line II—II of FIG. 1, illustrating four preferred embodiments of support assemblies distributed about the circumference of the motor.

The support assemblies shown in the Figures serve the purpose of isolating a fan motor from its carrier as concerns radial and tangential excitation oscillations generated during the operation of the motor, and designated with arrows 2 and 4 in FIG. 2.

Figure 1:
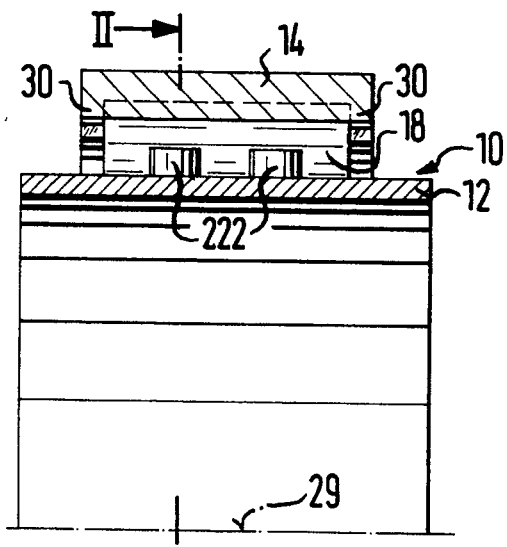
FIG. 1 is a partial axial sectional view of a tubular housing portion of an electric motor spacedly surrounded by a carrier ring having support bases for the motor housing.

In FIG. 1, an electric motor generally designated at 10 is represented by its tubular housing portion 12. The housing portion 12 may be, for example, a ferromagnetic body having a closed magnetic flux path. The electric motor 10 is surrounded by a carrier ring 14 whose inner diameter is greater than the outer diameter of the housing part 12, whereby an annular clearance 16 is obtained between the outer surface 17 of the housing portion 12 and the inner surface 15 of the carrier ring 14, as seen in FIG. 2.

Figure 3:
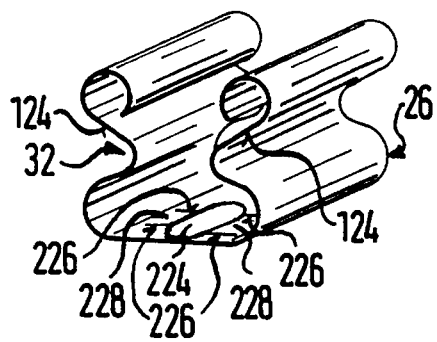
FIG. 3 is a perspective view of a further preferred embodiment of an elastic element forming part of the suspension system of the motor.

As it may be particularly well observed in FIG. 2, the clearance 16 is bridged by elastic elements 18, 20, 22 and 24, representing four different embodiments of the invention. While theoretically or for demonstration purposes, it is feasible to provide a single motor construction in which, as shown in FIG. 2, four differently configured suspension systems (support assemblies) may be present, for practical purposes in any one motor construction four identical elastic elements 18 or 20 or 22 or 24 are used to form a suspension system for the electric motor 10 in the carrier ring 14. FIG. 3 illustrates a further elastic element 26.

It is a common characteristic of all the resilient elements 18, 20, 22, 24 and 26 that they are of strip-like configuration and have a substantially U-shaped cross section. The length dimension of the resilient elements is oriented parallel to the rotary axis 29 of the armature of the electric motor 10.

The elastic strip (spring strip) 18, similarly to the other elastic elements 20, 22, 24 and 26, engages with its U-base 118 a backup face 21 of the outer surface 17 of the motor housing portion 12. An undercut projection 120 of the base 118 passes through an aperture 122 provided in the carrier ring 14, so that the spring strip 18 may be snapped in place in the housing portion 12 by momentarily simply pressing the U-legs 124 to one another. The free ends of the legs 124 are at their end bent arcuately outwardly to form support tubes 126. The latter are held in complemental, groove-like wells 127 conforming to the support tubes 126 in the support zones (support bases) 28 of the carrier ring 14. The wells 127 are so configured that the support tubes 126 of the strip 28 are held firmly captive therein.

The above-described features of the spring strip 18 equally apply to the spring strip 20, except that instead of the detent connection 120 the spring strip 20 is attached to the housing portion 12 by means of a hollow rivet 128.

The spring strips 22 and 24 (FIG. 2) and the spring strip 26 (FIG. 3) are attached to the housing portion 12 by means of a known "speed nut" connection. For this purpose, the housing portion 12 has a radially outwardly projecting pin 222 which is adapted to pass through an aperture 224 provided in the U-base of the spring strip 22. The pin 222, as seen when comparing FIGS. 1 and 2, is elongated in the axial direction. The structure of the "speed nut" connection is best seen in FIG. 3. The aperture 224 in the U-base of the spring strip 22 has a slightly smaller width than the width of the pin 222. To ensure that the spring strip 22 can be secured to the pin 222, in the U-base of the spring strip 22 cuts 226 are provided which end at the edge defining the aperture 224. In this manner, between the pairwise arranged cuts 226 elastically bendable tabs 228 are provided which, upon insertion of the spring strip 22, 24 or 26 onto the pin 222 will yield and bend out of their original plane. Upon insertion, the two tabs 228 are slightly bent outwardly and hook into the side faces of the pin 222 so that the spring strip 22 or 24 or 26 is secured against unintentional removal from the pin 222.

In all embodiments of the invention the free ends of the U-legs 124 of the spring elements (spring strips) 18, 20, 22, 24 and 26 engage the support bases 28 of the carrier ring 14.

In the embodiment represented by the spring strip 22, the free ends of the U-legs of the spring strip 22 are not rolled in as in the spring strip 21, but are bent outwardly to extend linearly and are held by bent-over tabs 230 forming a support base of the carrier ring 14.

The spring strip 24 has outwardly rolled-in leg ends, similarly to the spring strips 18 and 20. The rolled-in support tubes 326 of the spring strip 24 are held in an elastomer damping element 320. This embodiment is particularly adapted for a steplessly variable motor, where, especially at lower rpm's individual low exciting frequencies appear. In such a case the exciting frequency $\omega$ may equal the natural frequency of the spring system (that is, $\eta=1$) or may be less than the natural frequency $\omega_1(\eta>1)$. Under such circumstances and without additional measures the spring element 24 would achieve only a slight oscillation isolation, if any at all. By virtue of the elastomer element 320 arranged in series with the spring element 24, a damping is effected for such low frequency excitation oscillations and the very high frequencies which propagate over the spring material. By virtue of the tubular shape of the free ends of the U-legs and the support wells 327 formed in the elastomer element 320 for receiving the tubular ends, a rotary motion of the ends of the spring strips relative to the damping element 320 is possible thereby achieving an additional damping effect.

The spring strips, as shown in FIG. 1 for strip 18, are secured in the carrier ring 14 against axial displacement by wall portions 30 defining the opposite axial ends of the leg-receiving wells (designated at 327 in FIG. 2).

It is apparent that the natural frequency of the spring strips or the respective suspension systems may be set by adapting the material thickness to the spring width by an appropriate selection of shape. In this connection reference is again made to the embodiment of the spring strip 26 shown in FIG. 3 where the two U-legs when viewed together, have a curved, swan neck-like constriction 32.

It will be understood that the above description of the present invention is susceptible to various modifications, changes and adaptations, and the same are intended to be comprehended within the meaning and range of equivalents of the appended claims.

What is claimed is:

1. An electric motor comprising
   (a) a rotary axis;
   (b) a generally tubular housing portion having an outer surface;
   (c) a plurality of fixedly held support bases spaced circumferentially about the housing portion; each said support base being at a radial distance from said outer surface of said housing portion; and
   (d) a plurality of elastic elements, each being secured to said outer surface of said housing portion and to a separate one of said support bases for supporting the electric motor by said housing portion and for suppressing circumferential and radial excitation oscillations generated by the electric motor during operation thereof; each said elastic element being formed of a cross-sectionally generally U-shaped strip having a length dimension oriented parallel to said rotary axis; each said elastic element having a base portion secured to said outer surface of said housing portion and two oppositely located leg portions extending from said base portion; each said leg portion having a free end secured to a respective said support base; said elastic elements together forming a suspension system; said suspension system being tuned to the excitation oscillations of the electric motor such that the natural frequency of said suspension system is less than the excitation frequency of said electric motor.

2. The electric motor as defined in claim 1, further comprising a carrier ring circumferentially surrounding said housing portion with a clearance; said support bases being formed on an inner circumferential surface of said carrier ring.

3. The electric motor as defined in claim 1, wherein at least one of said elastic elements is of metal.

4. The electric motor as defined in claim 1, further comprising bent-over tabs provided on at least one of said support bases; said tabs holding the free ends of the leg portions against a surface of said at least one support base.

5. The electric motor as defined in claim 1, further comprising a rivet securing at least one of said elastic elements to said housing portion.

6. The electric motor as defined in claim 1, further comprising a snap-in detent means for securing at least one of said elastic elements to said housing portion.

7. The electric motor as defined in claim 1, wherein the free ends of said leg portions of at least one of said elastic elements are rolled in to form tubular supports; and further wherein at least one of said support bases comprise a groove-shaped well having an outline complemental to an outline of said tubular supports; said well receiving respective said tubular supports.

8. The electric motor as defined in claim 1, wherein the free ends of said leg portions are rolled in to form tubular supports; and further wherein at least one of said support bases define a recess; further comprising an elastomer damping element received in said recess and a groove-shaped well provided in said elastomer damping element; the well having an outline complemental to an outline of said tubular supports; said well receiving respective said tubular supports.

9. The electric motor as defined in claim 1, further comprising at least one pin projecting from said outer surface of said housing portion; said base portion of at least one of said elastic elements having an aperture bounded by flexible tabs forming part of said base portion; said aperture and said flexible tabs forming a speed nut connection securing said elastic element to said pin.

10. The electric motor as defined in claim 9, wherein said pin is radially oriented.

\* \* \* \* \*